(12) United States Patent
Kim et al.

(10) Patent No.: US 7,660,025 B2
(45) Date of Patent: Feb. 9, 2010

(54) REFLECTIVE UNIT USING ELECTROACTIVE POLYMER AND FLEXIBLE DISPLAY EMPLOYING THE REFLECTIVE UNIT

(75) Inventors: Jin-hwan Kim, Suwon-si (KR); Byoung-ho Cheong, Seoul (KR); Hong-seok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 11/955,745

(22) Filed: Dec. 13, 2007

(65) Prior Publication Data
US 2008/0291521 A1    Nov. 27, 2008

(30) Foreign Application Priority Data
May 23, 2007    (KR) .................. 10-2007-0050264

(51) Int. Cl.
*G02B 26/08* (2006.01)
*G02B 26/00* (2006.01)
(52) U.S. Cl. .................. 359/223; 359/224; 359/291

(58) Field of Classification Search .................. 359/196, 359/223, 224, 230, 290, 291, 295, 298, 321, 359/322; 385/2, 4, 8
See application file for complete search history.

(56) References Cited

U.S. PATENT DOCUMENTS

| 7,003,187 B2 * | 2/2006 | Frick et al. ..................... 385/16 |
| 7,061,661 B2 * | 6/2006 | Kowarz et al. ............... 359/291 |

* cited by examiner

*Primary Examiner*—Jack Dinh
(74) *Attorney, Agent, or Firm*—Sughrue Mion, PLLC (57) ABSTRACT

Provided are a reflective unit using an electroactive polymer and a flexible display. The reflective unit includes: an electroactive polymer layer which becomes strained when a voltage is applied thereto by an electrode; a light reflecting unit reflecting external light and having reflecting cells arranged on the electroactive polymer layer to be spaced apart from one another wherein a distance between the reflecting cells is changed according to the strain of the electroactive polymer layer; and a light blocking layer preventing external light from being reflected by the light reflecting unit and having blocking cells arranged over the light reflecting unit to be spaced apart from one another.

17 Claims, 6 Drawing Sheets

REFLECTIVE UNIT USING ELECTROACTIVE POLYMER AND FLEXIBLE DISPLAY EMPLOYING THE REFLECTIVE UNIT

CROSS-REFERENCE TO RELATED PATENT APPLICATION

This application claims the benefit of Korean Patent Application No. 10-2007-0050264, filed on May 23, 2007, in the Korean Intellectual Property Office, the disclosure of which is incorporated herein in its entirety by reference.

BACKGROUND OF THE INVENTION

1. Field of the Invention

Apparatuses consistent with the present invention relates to a reflective unit using an electroactive polymer and a flexible display employing the reflective unit, and more particularly, to a reflective unit using an electroactive polymer that becomes strained when a voltage is applied thereto and a flexible display employing the reflective unit and having a rapid response to an input signal and high contrast.

2. Description of the Related Art

With the rapid development of communication technologies and display apparatuses, various kinds of portable terminals have been introduced. Examples of portable terminals include personal digital assistants (PDAs), portable multimedia players (PMPs), and digital multimedia broadcasting (DMB) phones. Such portable terminals use light-emitting displays or light-receiving displays.

Recently, interest is growing on displays that can conveniently display an image using sunlight or external illumination without electrically illuminating the displays. However, displays using sunlight or external illumination have low contrast and slow response to an image input signal, thereby making it difficult to display a high quality moving picture.

SUMMARY OF THE INVENTION

The present invention provides a reflective unit that can control the reflectance of external light.

The present invention also provides a flexible display having a rapid response to an input signal and high contrast.

The present invention also provides a display creating an image using external light.

According to an aspect of the present invention, there is provided a reflective unit comprising: an electroactive polymer layer which becomes strained when a voltage is applied thereto by an electrode; a light reflecting unit reflecting external light and having reflecting cells arranged on the electroactive polymer layer to be spaced apart from one another wherein a distance between the reflecting cells is changed according to the strain of the electroactive polymer layer; and a light blocking layer preventing external light from being reflected by the light reflecting unit and having blocking cells arranged over the light reflecting unit to be spaced apart from one another.

The reflecting cells may be reflecting micro mirrors.

The reflective unit may further comprise sub-blocking cells disposed between the reflecting cells and preventing external light from being reflected between the reflecting cells.

The light reflecting unit and the light blocking unit may be disposed in the same medium.

The light blocking unit may be spaced apart from the light reflecting unit.

The reflecting cells of the light reflecting unit may be arranged to face the blocking cells of the light blocking unit such that the blocking cells can prevent external light from being reflected by the light reflecting unit when no voltage is applied to the electroactive polymer layer.

The electrode may include a first electrode disposed under the electroactive polymer layer and a second electrode disposed over the electroactive polymer layer.

The electrode may be formed of a flexible material that is deformed according to the strain of the electroactive polymer layer.

The electroactive polymer layer may have a thickness of 0.001 to 100 μm.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, lengths and sizes of layers and regions may be exaggerated for clarity.

It will be understood that when an element or layer is referred to as being on another element or layer, the element or layer can be directly on another element or layer or intervening elements or layers. In contrast, when an element is referred to as being directly on another element or layer, there are no intervening elements or layers present. Like numbers refer to like elements throughout. As used herein, the term and/or includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as below or lower and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as below other elements or features would then be oriented above the other elements or features. Thus, the exemplary term below can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms a, an and the are intended to include plural forms as well, unless the context clearly indicates otherwise. It will be further understood that the terms Comprises and/or comprising, when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
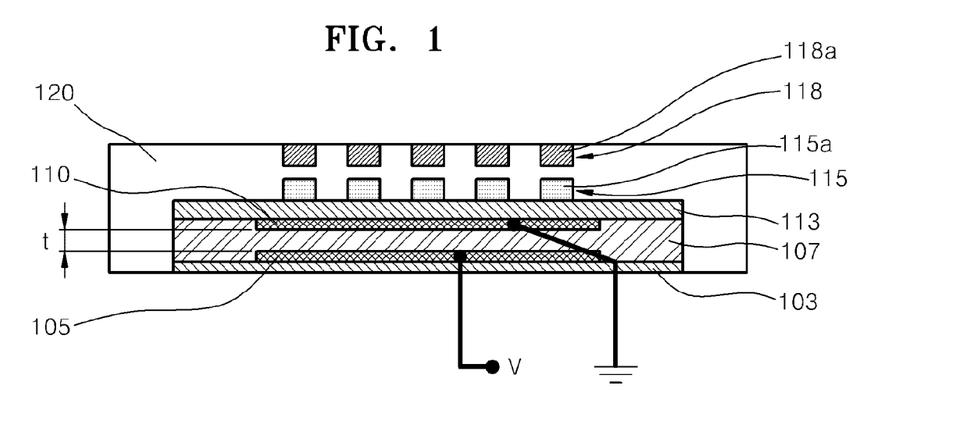
FIG. 1 is a cross-sectional view of a reflective unit using an electroactive polymer according to an embodiment of the present invention.

FIG. 1 is a cross-sectional view of a reflective unit according to an embodiment of the present invention. Referring to FIG. 1, the reflective unit includes an electroactive polymer layer 107 which becomes strained when a voltage is applied thereto, a light reflecting unit 115 which deforms according to the strain of the electroactive polymer layer 107 and reflecting external light, and a light blocking unit 118 disposed over the light reflecting unit 115 which prevents external light from being reflected by the light reflecting unit 115 and absorbs light reflected off the light reflecting unit 115.

The light reflecting unit 115 for reflecting external light includes reflecting cells 115a disposed on the electroactive polymer layer 107 and spaced apart from one another, and a distance between each of the reflecting cells 115a changes according to the strain of the electroactive polymer layer 107. The light blocking unit 118 for preventing external light from being reflected by the light reflecting unit 115 and absorbing light reflected off the light reflecting unit 115, includes blocking cells 118a arranged over the light reflecting unit 115 and spaced apart from one another.

The reflective unit controls the reflectance of light by controlling a voltage applied to the electroactive polymer layer 107.

The electroactive polymer layer 107 is strained when a voltage is applied thereto. A first electrode 105 and a second electrode 110 apply a voltage to the electroactive polymer layer 107. Once a voltage is applied to the electroactive polymer layer 107, a stress is applied to the electroactive polymer layer 107 due to an electric field generated between the first electrode 105 and the second electrode 110, and thus the electroactive polymer 107 is strained due to the stress. For the purpose of generating an electric field over as large an area as possible, the first electrode 105 may be disposed under the electroactive polymer layer 107 and the second electrode 110 may be disposed over the electroactive polymer layer 107. Each of the first electrode 105 and the second electrode 110 may be formed of a flexible material so that they can be deformed when the electroactive polymer layer 107 is strained. The properties of an electroactive polymer are disclosed in R. Pelrine, et. al., Science. 287, 836 (2000). The degree of strain of the electroactive polymer layer 107 varies depending on what kind of polymer is used. The strain amounts for a variety of polymers are shown in Table 1.

TABLE 1

[Table 1] Circular and linear strain test results

| Material | Prestrain (x, y)(%) | Actuated relative area strain (%) | Actuated relative area strain (%) | Field strength (MV/m) | Effective compressive stress (MPa) | Estimated ½e (MJ/m$^3$) |
|---|---|---|---|---|---|---|
| | | Circular strain | | | | |
| HS3 silicone | (68, 68) | 48 | 93 | 110 | 0.3 | 0.098 |
| | (14, 14) | 41 | 69 | 72 | 0.13 | 0.034 |
| CF 19-2186 silicon | (45, 45) | 39 | 64 | 350 | 3.0 | 0.75 |
| | (15, 15) | 25 | 33 | 160 | 0.6 | 0.091 |
| VHB 4910 acrylic | (300, 300) | 61 | 158 | 412 | 7.2 | 3.4 |
| | (15, 15) | 29 | 40 | 55 | 0.13 | 0.022 |

TABLE 1-continued

[Table 1] Circular and linear strain test results

| Material | Prestrain (x, y)(%) | Actuated relative area strain (%) | Actuated relative area strain (%) | Field strength (MV/m) | Effective compressive stress (MPa) | Estimated ½e (MJ/m³) |
|---|---|---|---|---|---|---|
| | | | Linear strain | | | |
| HS3 | (280, 0) | 54 | 117 | 128 | 0.4 | 0.16 |
| CF 19-2186 | (100, 0) | 39 | 63 | 181 | 0.8 | 0.2 |
| VHB 4910 | (540, 75) | 68 | 215 | 239 | 2.4 | 1.36 |

Figure 2:
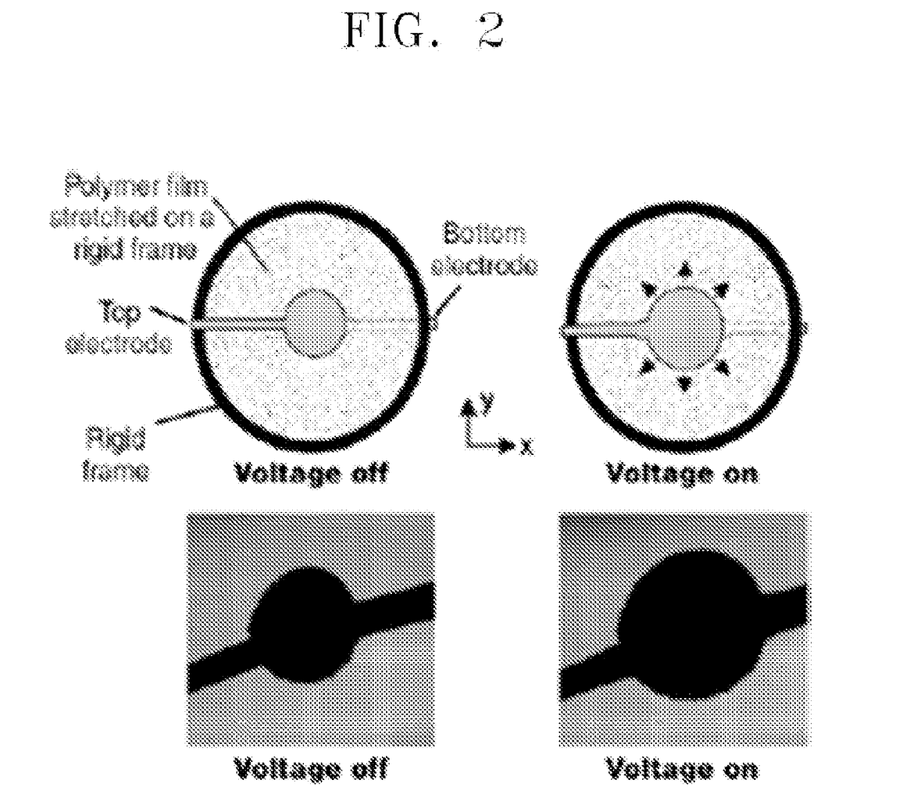
FIG. 2 illustrates a circular strain occurring when a voltage is applied to the electroactive polymer used in a flexible display.
Figure 3:
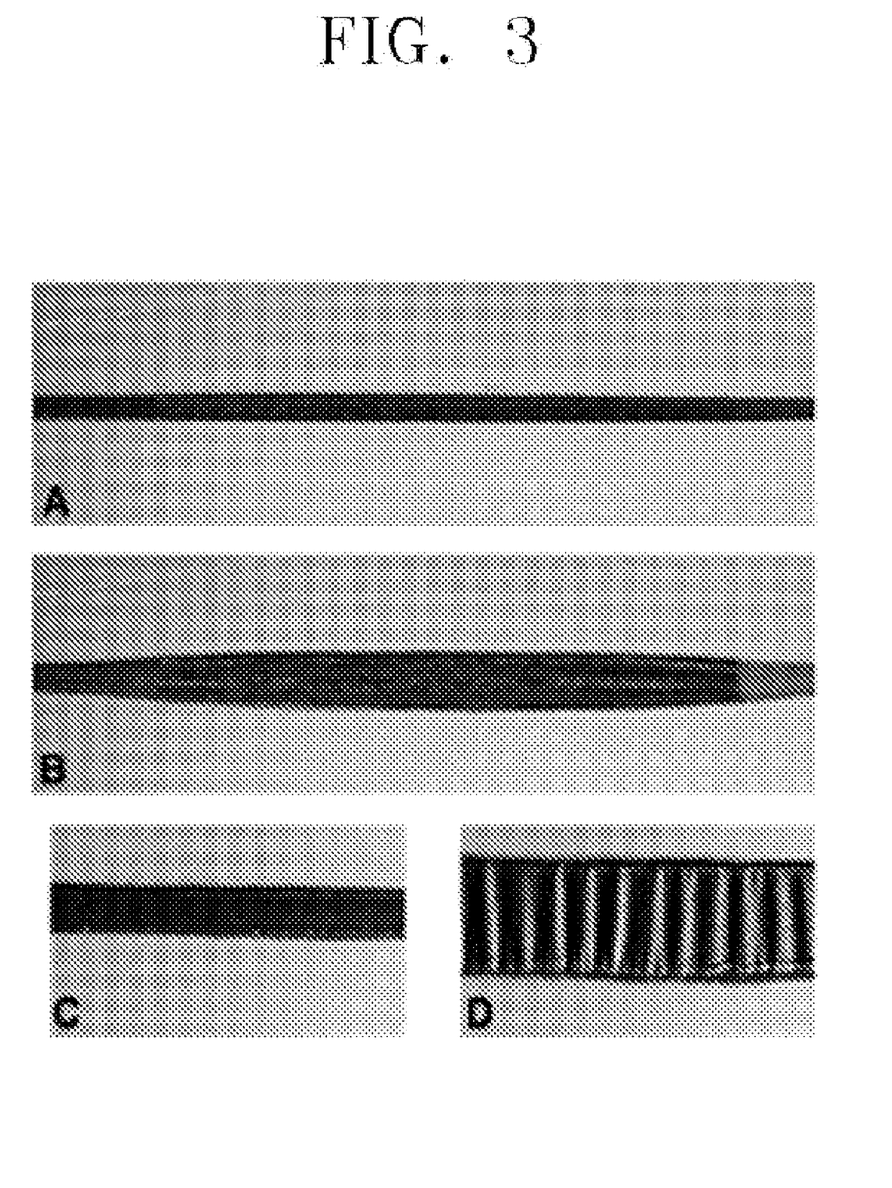
FIG. 3 illustrates a linear strain occurring when a voltage is applied to the electroactive polymer used in the flexible display.

In order to increase the degree of strain of an electroactive polymer, a prestrain is applied. When a circular or linear prestrain is applied, the area of the electroactive polymer is increased. FIG. 2 illustrates an electroactive polymer before and after a voltage is applied to the electroactive polymer. When a circular prestrain is first applied and then a voltage is applied, the area of the electroactive polymer is increased and thus electrodes are extended. FIG. 3 illustrates a cross section of an electroactive polymer when a linear prestrain is first applied and then a voltage is applied. Referring to FIG. 3, the cross sectional area of the electroactive polymer is increased from A to B, and from C to D.

The light reflecting unit 115, which is disposed on the electroactive polymer layer 107, is deformed when the electroactive polymer layer 107 is strained such that a distance between the reflecting cells 115a is changed. The reflecting cells 115 may be reflecting micro mirrors. When the second electrode 110 is disposed over the electroactive polymer layer 107, the light reflecting unit 115 may be disposed on the second electrode 110. Alternatively, when a support layer 113 is disposed on a second electrode 110, the light reflecting layer 115 may be disposed on the support layer 113. The support layer 113 may be formed of an electroactive polymer.

The light blocking unit 118 may include a plurality of blocking cells 118a corresponding to the reflecting cells 115a of the light reflecting unit 115. The blocking cells 118a are arranged at predetermined intervals to be spaced apart from one another and face the reflecting cells 115a such that the blocking cells 118 can prevent external light from being reflected by the light reflecting unit 115 when no voltage is applied to the electroactive polymer layer 107. The blocking cells 118a absorb light and prevent light from passing therethrough. The light blocking unit 118 may be spaced apart from the light reflecting unit 115, and a space between the light reflecting unit 115 and the light blocking unit 118 may be filled with a low reflective medium 120. The low reflective medium 120 may be formed of an index matching material.

The operation of the reflective unit according to the strain of the electroactive polymer layer 107 will now be explained.

Figure 4A:
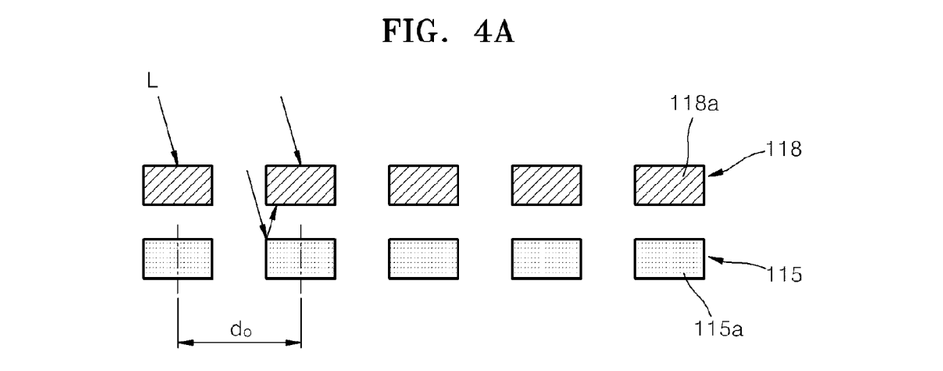
FIG. 4A illustrates a light reflecting unit and a light blocking unit when no voltage is applied to the flexible display.

FIG. 4A illustrates the state where the reflecting cells 115a and the blocking cells 118a are aligned with each other when no voltage is applied to the electroactive polymer layer 107. That is, the centrelines of the reflecting cells 115a and the blocking cells 118a coincide with each other. In this state, part of external light L is absorbed by the blocking cells 118a, and the remaining part of the external light L which passes between the blocking cells 118a, is reflected by the reflecting cells 115a, and then is absorbed by the blocking cells 118a, thereby displaying black. The blocking cells 118a may be formed of a material that can absorb light, and the reflecting cells 115a and the blocking cells 118a may have the same width.

Figure 4B:
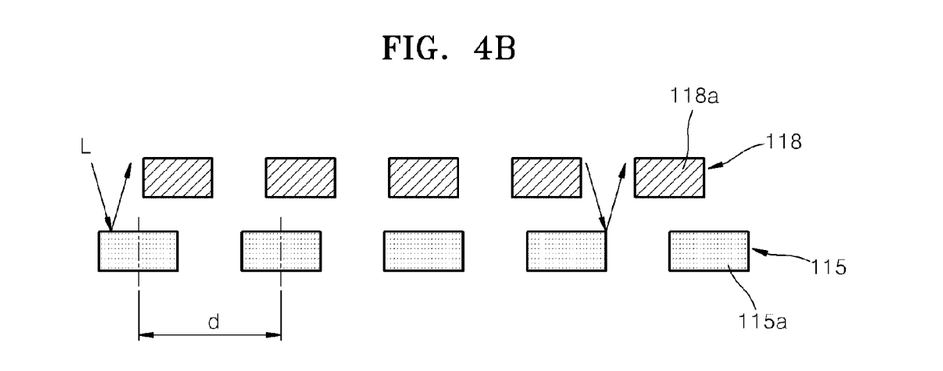
FIG. 4B illustrates the light reflecting unit and the light blocking unit when a first voltage is applied to the flexible display.

FIG. 4B illustrates the state where the electroactive polymer layer 107 strained and the reflecting cells 115a are accordingly extended when a first voltage V1 is applied to the electroactive polymer layer 107. Since the light reflecting unit 115 is deformed whereas the light blocking unit 118 is not deformed when the first voltage V1 is applied to the electroactive polymer layer 107, there is a positional difference between the light reflecting unit 115 and the light blocking unit 118. Therefore, the centrelines of the light reflecting cells 115a and the blocking cells 118a no longer coincide with each other. In this state, part of the external light L which passes between the blocking cells 118a, is reflected by the reflecting cells 115a, and is reflected by the reflective unit.

When a distance between the reflecting cells 115a when no voltage is applied to the electroactive polymer layer 107 is $d_0$ and a distance between the reflecting cells 115a when a voltage V is applied to the electroactive polymer layer 107 is d, the distance d between the reflecting cells 115a is defined by $$d = \frac{d_0}{\sqrt{1 - \varepsilon \varepsilon_0 \frac{V^2}{Yt^2}}} \quad (1)$$

where $\varepsilon$ denotes the dielectric constant of the reflecting cells 115a, $\varepsilon_0$ denotes the dielectric constant of air, Y denotes a Youngs Modulus, and t denotes a distance between the first electrode 105 and the second electrode 110 (see FIG. 1). Accordingly, the distance d between the reflecting cells 115a can be controlled by changing the voltage V applied to the electroactive polymer layer 107 and the distance t between the first electrode 105 and the second electrode 110. As the voltage V increases, the distance d between the reflecting cells 115a increases, and as the distance t between the first electrode 105 and the second electrode 110 increases, the distance d between the reflecting cells 115a decreases. If the electroactive polymer layer 107 is thick, the electroactive polymer layer 107 is strained only when a high voltage is applied. Accordingly, the electroactive polymer layer 107 should have a thickness ranging from 0.001 to 100 μm.

Figure 4C:
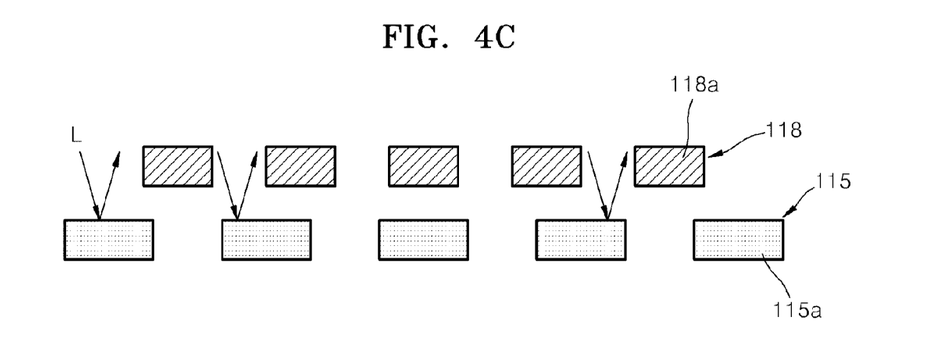
FIG. 4C illustrates an arrangement relationship between the light reflecting unit and the light blocking unit when a second voltage greater than the first voltage is applied to the flexible display.

FIG. 4C illustrates the state where the electroactive polymer layer 107 strained and the reflecting cells 115a are accordingly extended when a second voltage V2 greater than the first voltage V1 is applied to the electro active polymer layer 107. The degree of strain of the electroactive polymer layer 107 when the second voltage V2 is applied to the electroactive polymer layer 107 is greater than the degree of strain of the electroactive polymer layer 107 when the first voltage V1 is applied to the electroactive polymer layer 107. Accordingly, the degree of deformation of the reflecting cells 115a when the second voltage V2 is applied to the electroactive polymer layer 107 is greater than the degree of deformation of the reflecting cells 115a when the first voltage V1 is applied to the electroactive polymer layer. As the degree of deformation of the reflecting cells 115a increases, a larger amount of light which passes between the blocking cells 118a is reflected by the reflecting cells 115a and is reflected by the reflective unit.

Figure 5:
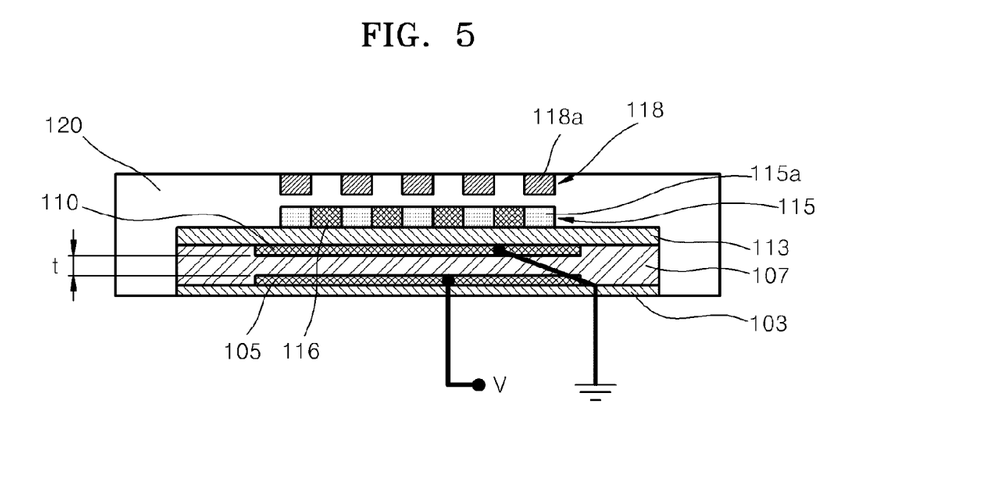
FIG. 5 is a cross-sectional view of a modification of the reflective unit using the electroactive polymer of FIG. 1.

FIG. 5 is a cross-sectional view illustrating a modification of the reflective unit of FIG. 1. The reflective unit of FIG. 5 is different from the reflective unit of FIG. 1 in that sub-blocking cells 116 are disposed between the reflecting cells 115a. The sub-blocking cells 116 may be disposed to prevent external light from passing between the blocking cells 118a from being reflected between the reflecting cells 115 when black is to be displayed.

A flexible display according to the present invention employs the reflecting unit to display gradation. In other words, the flexible display adjusts the reflectance of light in order to display gradation using an electroactive polymer that is strained when a voltage is applied thereto. The flexible display includes a plurality of pixels, and the plurality of pixels emit different light according to input signals. The flexible display creates an image by reflecting external light, such as sunlight or ambient light.

Figure 6:
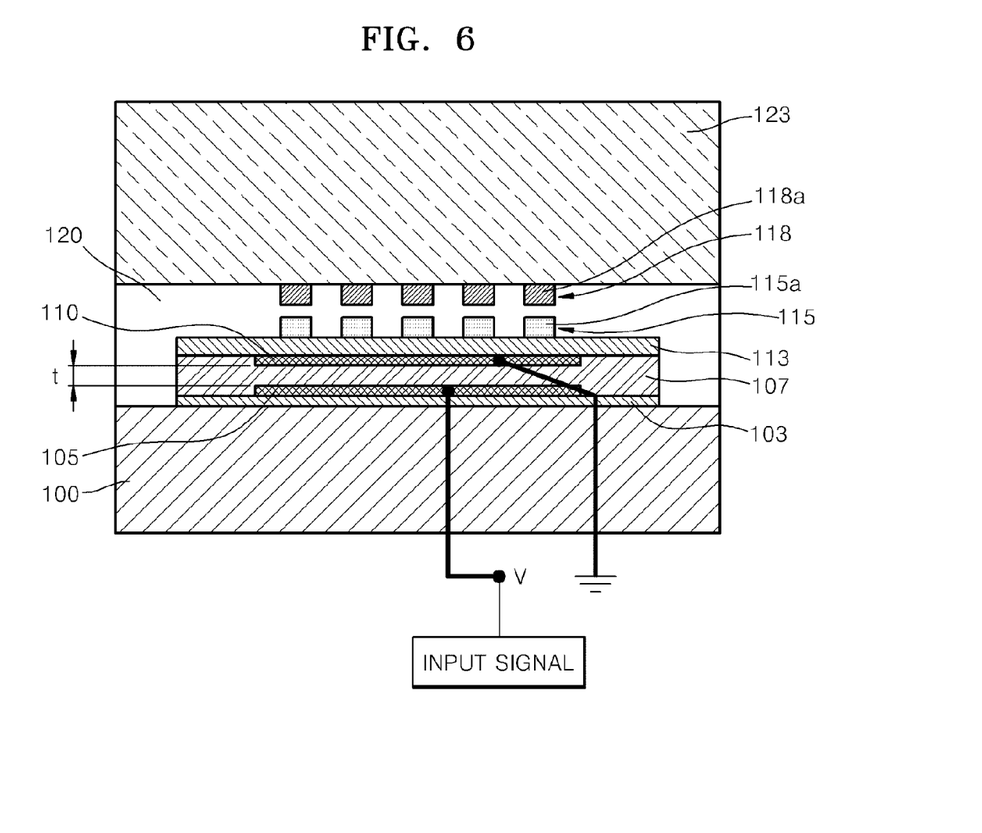
FIG. 6 is a cross-sectional view of a pixel of a flexible display using an electroactive polymer according to an embodiment of the present invention.

FIG. 6 is a cross-sectional view of a pixel of a flexible display according to an embodiment of the present invention. Referring to FIG. 6, the pixel includes a first substrate 100, an electroactive polymer layer 107 disposed on the first substrate 100, a light reflecting unit 115 disposed on the electroactive polymer layer 107, and a light blocking unit 118 disposed over the light reflecting unit 115. An insulating layer 103 may be disposed between the first substrate 100 and the electroactive polymer layer 107. A second substrate 123 may be disposed over the electroactive polymer layer 107. The second substrate 123 may be formed of a transparent material, such as polyethylene terephthalate (PET) or glass, through which light can be transmitted.

As described with reference to FIG. 1, gradation of each pixel can be displayed by controlling a voltage applied to the electroactive polymer layer 107 to control the amount of light reflected by the light reflecting unit 115. That is, desired gradation for each pixel can be displayed by controlling a misalignment between the light reflecting unit 115 and the light blocking unit 118.

Figure 7:
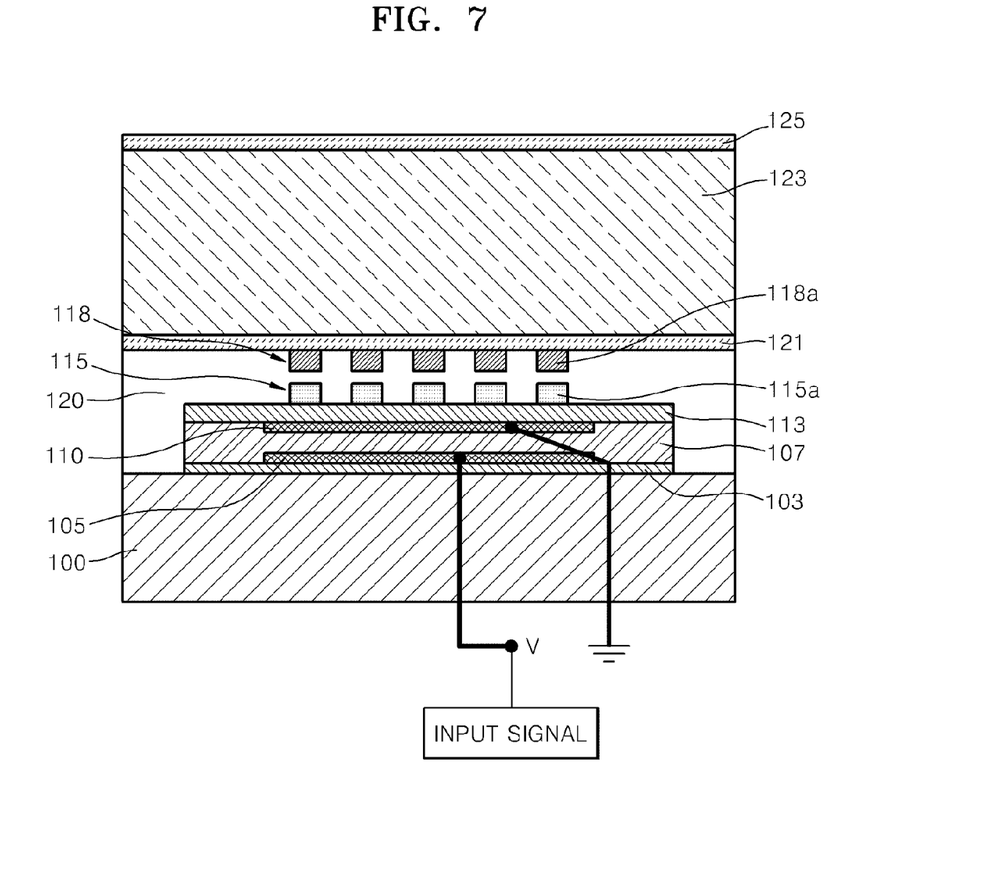
FIG. 7 is a cross-sectional view of a pixel of a flexible display according to another embodiment of the present invention.

FIG. 7 is a cross-sectional view of a modification of the flexible display of FIG. 6. The flexible display of FIG. 7 is different from the flexible display of FIG. 6 in that a first anti-reflection layer 121 is disposed under the second substrate 123 and a second anti-reflection layer 125 is disposed over the second substrate 123. The first anti-reflection layer 121 and the second anti-reflection layer 125 prevent external light from being reflected before reaching the light reflecting unit 115 in order to increase the amount of light incident on the light reflecting unit 115.

Since the electroactive polymer layer 107 has a rapid response to an input signal, there is no difficulty in producing a moving picture. Since the degree of strain of the electroactive polymer can be easily adjusted according to a voltage applied thereto and the reflectance of light can be adjusted according to the degree of strain due to the voltage, contrast can be improved.

As described above, the reflective unit and the flexible display employing the reflective unit according to the present invention displays gradation and an image by controlling the reflectance of external light according to the strain of the electroactive polymer layer. Since the light reflecting unit, which is disposed on the electroactive polymer layer, is misaligned with the light blocking layer, which is disposed to face the light reflecting unit, when the electroactive polymer layer is strained, contrast can be improved by controlling the reflectance of light by controlling the amount of strain. Also, since the electroactive polymer layer has a short response time, a moving picture can be easily produced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A reflective unit comprising:
an electroactive polymer layer which becomes strained when a voltage is applied thereto by an electrode;
a light reflecting unit disposed over the electroactive polymer layer, the light reflecting unit comprising reflecting cells which reflect external light and are spaced apart from one another wherein a distance between the reflecting cells changes according to a strain of the electroactive polymer layer; and
a light blocking layer disposed over the light reflecting unit, the light blocking layer comprising blocking cells which absorb light and are spaced apart from one another.

2. The reflective unit of claim 1, wherein the reflecting cells are reflecting micro mirrors.

3. The reflective unit of claim 1, further comprising sub-blocking cells disposed between the reflecting cells, which prevent external light from being reflected between the reflecting cells.

4. The reflective unit of claim 1, wherein the light reflecting unit and the light blocking unit are disposed in a same medium.

5. The reflective unit of claim 4, wherein the medium is formed of a low reflective material.

6. The reflective unit of claim 4, wherein the medium is an index matching medium.

7. The reflective unit of claim 1, wherein the light blocking unit is spaced apart from the light reflecting unit.

8. The reflective unit of claim 1, wherein the reflecting cells of the light reflecting unit are arranged to face the blocking cells of the light blocking unit such that the blocking cells can absorb the external light reflected by the light reflecting unit when no voltage is applied to the electroactive polymer layer.

9. The reflective unit of claim 1, wherein the electrode includes a first electrode disposed under the electroactive polymer layer and a second electrode disposed over the electroactive polymer layer.

10. The reflective unit of claim 1, wherein the electrode is formed of a flexible material that is deformed according to the strain of the electroactive polymer layer.

11. The reflective unit of claim 1, further comprising a transparent substrate disposed on the light blocking layer.

12. The reflective unit of claim 11, further comprising a first anti-reflection layer disposed between the light blocking layer and the transparent substrate.

13. The reflective unit of claim 11, further comprising a second anti-reflection layer disposed on the transparent substrate.

14. The reflective unit of claim 1, wherein the electroactive polymer layer has a thickness of 0.001 to 100 μm.

15. A flexible display comprising a plurality of pixels, wherein each of the plurality of pixels comprises:
an electroactive polymer layer which becomes strained when a voltage is applied thereto;

a light reflecting unit disposed over the electroactive polymer layer, the light reflecting unit comprising a plurality of reflecting cells which reflect light and are spaced apart from one another at a distance which changes according to a strain of the electroactive polymer layer; and a light blocking layer disposed over the light reflecting unit, the light blocking layer comprising blocking cells which absorb light and are spaced apart from one another.

16. The flexible display of claim 15, wherein the reflecting cells are reflecting micro mirrors.

17. The flexible display of claim 15, further comprising sub-blocking cells disposed between the reflecting cells, which prevent external light from being reflected between the reflecting cells.

* * * * *